United States Patent
Amano et al.

(10) Patent No.: US 10,577,969 B2
(45) Date of Patent: Mar. 3, 2020

(54) VIBRATION REDUCTION DAMPER AND JET ENGINE

(71) Applicant: IHI Corporation, Koto-ku, Tokyo (JP)

(72) Inventors: Shinichi Amano, Tokyo (JP); Hideki Yanagida, Tokyo (JP); Masayuki Kadowaki, Tokyo (JP)

(73) Assignee: IHI Corporation, Tokyo (JP)

( * ) Notice: Subject to any disclaimer, the term of this patent is extended or adjusted under 35 U.S.C. 154(b) by 133 days.

(21) Appl. No.: 15/815,887

(22) Filed: Nov. 17, 2017

(65) Prior Publication Data

US 2018/0080340 A1    Mar. 22, 2018

Related U.S. Application Data

(63) Continuation of application No. PCT/JP2016/053572, filed on Feb. 5, 2016.

(30) Foreign Application Priority Data

Jun. 24, 2015 (JP) ................. 2015-126449

(51) Int. Cl.
  *F01D 25/04* (2006.01)
  *F16F 7/08* (2006.01)
  *F01D 25/18* (2006.01)

(52) U.S. Cl.
  CPC ............. *F01D 25/04* (2013.01); *F01D 25/18* (2013.01); *F16F 7/08* (2013.01); *F05D 2220/323* (2013.01); *F05D 2250/191* (2013.01); *F05D 2260/608* (2013.01); *F05D 2260/609* (2013.01); *F05D 2260/96* (2013.01); *F05D 2260/98* (2013.01)

(58) Field of Classification Search
  CPC .......... F01D 25/04; F01D 25/18; F04D 29/66; F04D 29/668; F05D 2220/323; F05D 2250/191; F05D 2260/608; F05D 2260/609; F05D 2260/96; F05B 2260/96; F16F 7/08
  USPC ......................................... 415/119
  See application file for complete search history.

(56) References Cited

U.S. PATENT DOCUMENTS 3,814,549 A * 6/1974 Cronstedt ............... F01D 25/04
                                                           417/406
4,973,221 A   11/1990 Anderson et al.
5,868,627 A * 2/1999 Stark ....................... F16F 15/12
                                                           464/180

(Continued)

FOREIGN PATENT DOCUMENTS

FR   2 901 313 A1   11/2007
FR   2 957 973 A1    9/2011

(Continued)

OTHER PUBLICATIONS

International Search Report dated Apr. 26, 2016 in PCT/JP2016/053572 filed Feb. 5, 2016 (with English Translation).

(Continued)

*Primary Examiner* — J. Todd Newton
(74) *Attorney, Agent, or Firm* — Oblon, McClelland, Maier & Neustadt, L.L.P.

(57) ABSTRACT

A vibration reduction damper is disposed inside a center vent tube having vent holes which pass therethrough in the radial direction, and has a sliding portion which comes slidably into contact with the inner wall surface of the center vent tube while avoiding the region in which the vent holes are formed.

6 Claims, 7 Drawing Sheets

(56) References Cited

U.S. PATENT DOCUMENTS

| | | | | |
|---|---|---|---|---|
| 6,279,221 | B1 * | 8/2001 | Glowacki | F16C 3/03 29/428 |
| 9,322,293 | B2 | 4/2016 | Brault et al. | |
| 2009/0005183 | A1 | 1/2009 | Baumhauer et al. | |
| 2009/0282679 | A1 | 11/2009 | Mons et al. | |
| 2013/0008550 | A1 | 1/2013 | Brault et al. | |
| 2013/0051982 | A1 | 2/2013 | Hindle et al. | |

FOREIGN PATENT DOCUMENTS

| | | |
|---|---|---|
| FR | 3 007 788 A1 | 1/2015 |
| JP | 02-286802 | 11/1990 |
| JP | 07-167211 | 7/1995 |
| JP | 3508941 | 1/2004 |
| JP | 2004-324594 | 11/2004 |
| JP | 2009-008080 | 1/2009 |
| JP | 2009-174528 | 8/2009 |
| JP | 2013-047515 | 3/2013 |
| WO | WO 94/20768 A1 | 9/1994 |
| WO | WO 2015/026899 A1 | 2/2015 |

OTHER PUBLICATIONS

Written Opinion dated Apr. 26, 2016 in PCT/JP2016/053572 filed Feb. 5, 2016.

\* cited by examiner

VIBRATION REDUCTION DAMPER AND JET ENGINE

CROSS-REFERENCE TO RELATED APPLICATIONS

The present application is a continuation application of International Application No. PCT/JP2016/053572, filed Feb. 5, 2016, which claims priority to Japanese Patent Application No. 2015-126449, filed Jun. 24, 2015. The contents of these applications are incorporated herein by reference in their entirety.

TECHNICAL FIELD

For example, Patent Document 1 discloses that vibration of a propeller shaft is attenuated by placing a cylindrical object inside a hollow propeller shaft. According to Patent Document 1, a diameter of the cylindrical object increases due to rotation of the propeller shaft and the cylindrical object comes into close contact with an inner circumferential surface of the propeller shaft. Vibration is attenuated by friction damping accompanying this phenomenon. This background art is also disclosed in the following Patent Documents 2 to 5.

DOCUMENTS OF THE RELATED ART

Patent Document

[Patent Document 1]
 Japanese Unexamined Patent Application, First Publication No. H7-167211
[Patent Document 2]
 Japanese Unexamined Patent Application, First Publication No. 2009-174528
[Patent Document 3]
 Japanese Unexamined Patent Application, First Publication No. 2009-8080
[Patent Document 4]
 Japanese Unexamined Patent Application, First Publication No. 2013-47515
[Patent Document 5]
 Japanese Unexamined Patent Application, First Publication No. H2-286802

SUMMARY

Further, as disclosed in Patent Document 2, in a jet engine, there is a case in which a center vent tube rotating together with a shaft is disposed inside the hollow shaft. Exhausting from an inside of the jet engine is performed using the center vent tube. For example, in order to suppress vibration of the center vent tube, it is conceivable to dispose the cylindrical object disclosed in Patent Document 1 inside the center vent tube.

However, as described above, the center vent tube is required to perform exhausting. Here, when the cylindrical object disclosed in Patent Document 1 is simply disposed inside the center vent tube, the center vent tube may become clogged by the cylindrical object.

The present disclosure is made in view of such problems, and an object of the present disclosure is to suppress vibration of a center vent tube without clogging the center vent tube installed in the jet engine.

In order to achieve the aforementioned objects, the present disclosure adopts the following aspects.

A first aspect of the present disclosure is a vibration reduction damper which is disposed inside a center vent tube having vent holes which pass therethrough in a radial direction and has a sliding portion configured to conic slidably in contact with an inner wall surface of the center vent tube while avoiding a region in which the vent holes are formed.

A second aspect is a jet engine with a center vent tube, including the vibration reduction damper of the first aspect.

According to the present disclosure, the vibration reduction damper has a sliding portion which is slidably in contact with the inner wall surface of the center vent tube. Therefore, when the center vent tube vibrates, friction occurs between the center vent tube and the vibration reduction damper, and the vibration of the center vent tube is attenuated. Further, according to the present disclosure, the sliding portion of the above-described vibration reduction damper is disposed to avoid the vent holes of the center vent tube. Accordingly, the vibration reduction damper can be prevented from blocking the vent holes of the center vent tube, and thus the center vent tube can be prevented from becoming clogged. Therefore, according to the present disclosure, vibration of the center vent tube can be suppressed without clogging the center vent tube installed in the jet engine.

Figure 5:
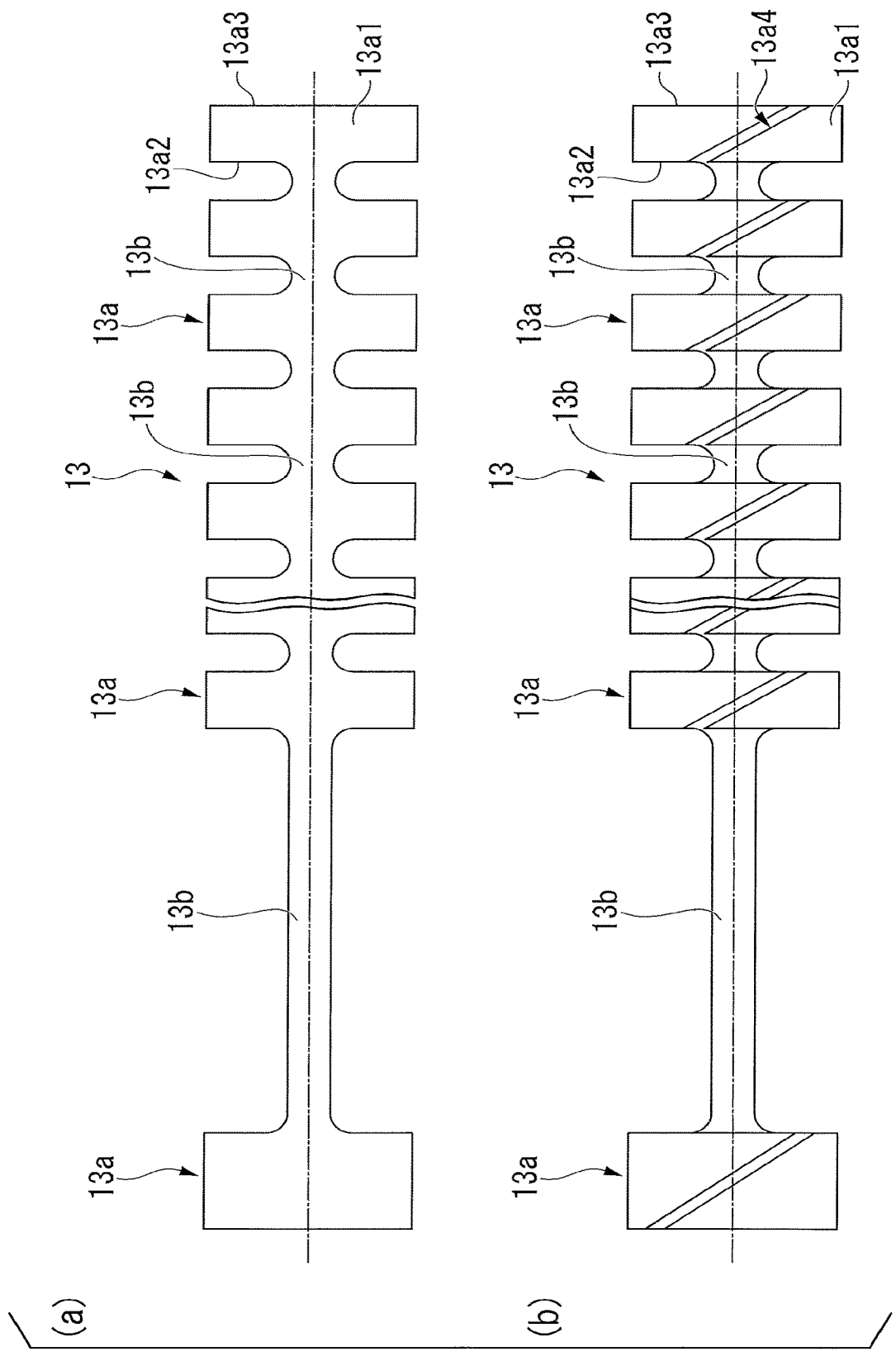

(a) of FIG. 5 is a plan view of the vibration reduction damper according to the first embodiment of the present disclosure, and (b) of FIG. 5 is a bottom view of the vibration reduction damper according to the first embodiment of the present disclosure.

Figure 6:
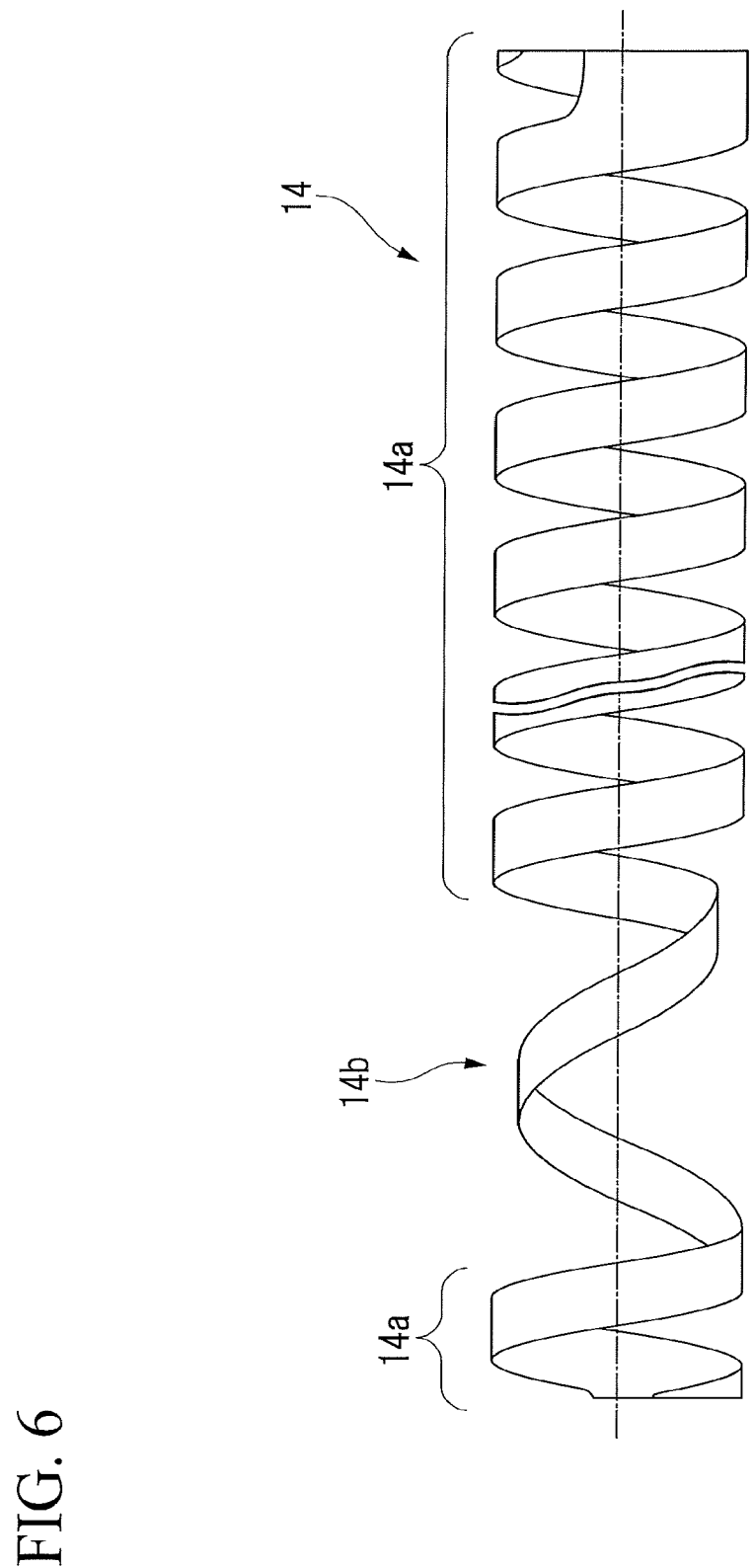

FIG. 6 is a side view of a vibration reduction damper according to a second embodiment of the present disclosure.

DETAILED DESCRIPTION

Hereinafter, one embodiment of a vibration reduction damper and a jet engine according to the present disclosure will be described with reference to the accompanying drawings. Further, in the following drawings, the scale of each member is appropriately changed to make each member have a recognizable size.

First Embodiment

Figure 1:
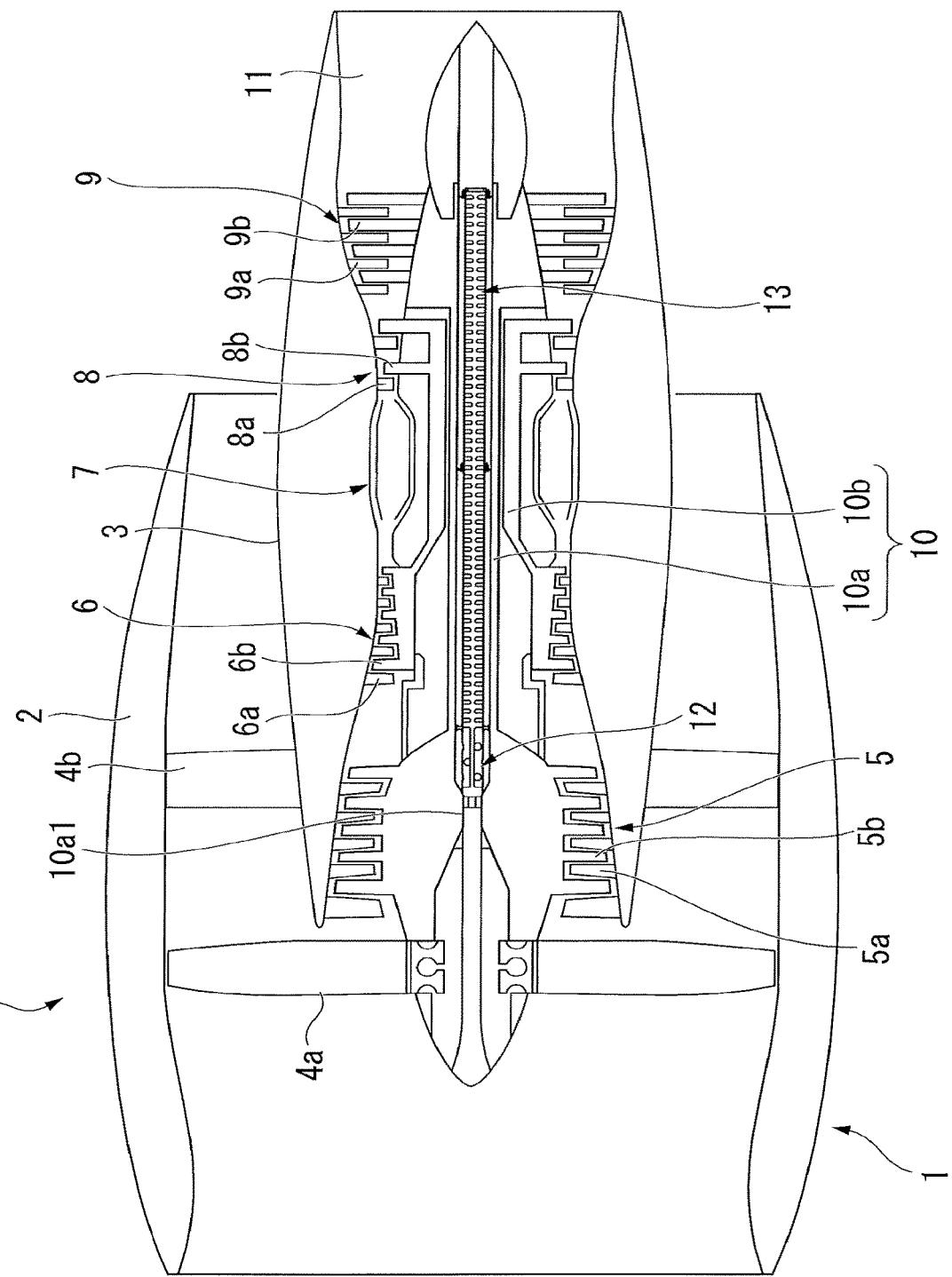
FIG. 1 is a cross-sectional view showing a schematic constitution of a jet engine with a vibration reduction damper according to one embodiment of the present disclosure.

FIG. 1 is a cross-sectional view showing a schematic constitution of a jet engine in which a vibration reduction damper of the embodiment is installed. In the following description, a left side of FIG. 1 will be referred to as an upstream side and a right side of FIG. 1 will be referred to as a downstream side with reference to an air flow direction. As shown in FIG. 1, a jet engine 1 includes a fan cowl 2, a core cowl 3, a fan unit 4, a low-pressure compressor 5, a high-pressure compressor 6, a combustor 7, a high-pressure turbine 8, a low-pressure turbine 9, a shaft 10, a main nozzle 11, a center vent tube 12 and a vibration reduction damper 13.

The fan cowl 2 is an approximately cylindrical member of which an upstream end and a downstream end are open and accommodates the fan unit 4 and so on therein. Also, the fan cowl 2 surrounds an upstream portion of the core cowl 3 arranged coaxially with the fan cowl 2 and is supported by the core cowl 3 through a support portion (not shown). The fan cowl 2 introduces external air from an opening on an upstream side thereof into an inside thereof and guides the introduced external air downstream toward the core cowl 3. The core cowl 3 has a diameter smaller than that of the fan cowl 2 and is an approximately cylindrical member of which an upstream end and a downstream end are open. The core cowl 3 accommodates the low-pressure compressor 5, the high-pressure compressor 6, the combustor 7, the high-pressure turbine 8, the low-pressure turbine 9, the shaft 10 and so on therein. Also, the fan cowl 2 and the core cowl 3 are installed in an aircraft fuselage by a pylon which is not shown.

Further, an inside of the core cowl 3 serves as a flow path (hereinafter referred to as a core flow path), the inside thereof on an upstream side from the combustor 7 serves as a flow path of air which is supplied to the combustor 7, and the inside thereof on a downstream side from the combustor 7 serves as a flow path of a combustion gas generated by the combustor 7. Also, a space between the fan cowl 2 and the core cowl 3 serves as a bypass flow path for exhausting remaining air of the air introduced into the fan cowl 2, which is not introduced into the core flow path, to an outside.

The fan unit 4 has a rotor blade row 4a including fan rotor blades fixed to the shaft 10 and a stationary blade row 4b including fan stationary blades arranged in the bypass flow path. The rotor blade row 4a pressure-feeds the air downstream with rotation of the shaft 10. In addition, the stationary blade row 4b rectifies the air flowing through the bypass flow path. As will be described later in detail, the shaft 10 includes a first shaft 10a disposed radially inward and a second shaft 10b disposed radially outward to surround the first shaft 10a. The fan rotor blades forming the rotor blade row 4a are fixed to the first shaft 10a of the shaft 10.

The low-pressure compressor 5 is disposed on an upstream side from the high-pressure compressor 6 and has stationary blade rows 5a and rotor blade rows 5b which are arranged alternately along a flow direction of the core flow path. One stationary blade row 5a is formed by annularly arranging stationary blades fixed to an inner wall of the core cowl 3 around the shaft 10. One rotor blade row 5b is formed by annularly arranging rotor blades fixed to the first shaft 10a of the shaft 10 around the shaft 10. The low-pressure compressor 5 compresses the air introduced into the core flow path by rotating the rotor blade rows 5b by the first shaft 10a.

The high-pressure compressor 6 is disposed on a downstream side from the low-pressure compressor 5 and has approximately the same constitution as that of the low-pressure compressor 5. That is, the high-pressure compressor 6 has stationary blade rows 6a and rotor blade rows 6b which are arranged alternately along the flow direction of the core flow path. One stationary blade row 6a is formed by annularly arranging stationary blades fixed to the inner wall of the core cowl 3 around the shaft 10. One rotor blade row 6b is formed by annularly arranging rotor blades fixed to the second shaft 10b of the shaft 10 around the shaft 10. The high-pressure compressor 6 further compresses the air compressed by the low-pressure compressor 5 by rotating the rotor blade rows 6b by the second shaft 10b.

The combustor 7 is disposed on a downstream side from the high-pressure compressor 6 and generates a combustion gas by burning a mixed gas of the compressed air delivered from the high-pressure compressor 6 and a fuel supplied from an injector which is not shown. For example, in the combustor 7, a flow rate of the fuel supplied from the injector is electronically controlled. Accordingly, an amount of the combustion gas generated (that is, a propulsive force of the jet engine 1) is adjusted.

The high-pressure turbine 8 is disposed on a downstream side of the combustor 7 and has stationary blade rows 8a and rotor blade rows 8b which are arranged alternately along the flow direction of the core flow path. One stationary blade row 8a is formed by annularly arranging stationary blades fixed to the inner wall of the core cowl 3 around the shaft 10. One rotor blade row 8b is formed by annularly arranging rotor blades fixed to the second shaft 10b of the shaft 10 around the shaft 10. The high-pressure turbine 8 rotates the second shaft 10b by receiving the combustion gas in the rotor blade row 8b while rectifying the combustion gas in the stationary blade row 8a.

The low-pressure turbine 9 is disposed on a downstream side of the high-pressure turbine 8 and has approximately the same constitution as that of the high-pressure turbine 8. That is, the low-pressure turbine 9 has a stationary blade rows 9a and rotor blade rows 9b which are arranged alternately along the flow direction of the core flow path. One stationary blade row 9a is formed by annularly arranging stationary blades fixed to the inner wall of the core cowl 3 around the shaft 10. One rotor blade row 9b is formed by annularly arranging rotor blades fixed to the first shaft 10a of the shaft 10 around the shaft 10. The low-pressure turbine 9 rotates the first shaft 10a by receiving the combustion gas in the rotor blade row 9b while rectifying the combustion gas in the stationary blade row 9a.

As described above, the shaft 10 includes the first shaft 10a disposed radially inward and the second shaft 10b disposed radially outward. The first shaft 10a has a length which reaches the rotor blade row 9b of the low-pressure turbine 9 from the rotor blade row 4a of the fan unit 4, and the rotor blade row 4a of the fan unit 4 and the rotor blade row 5b of the low-pressure compressor 5 are provided at an upstream end thereof, and the rotor blade row 9b of the low-pressure turbine 9 is provided at a downstream end thereof. The first shaft 10a has a cylindrical shape of which an upstream end and a downstream end are open and accommodates the center vent tube 12 therein. Further, as shown in FIG. 1, the first shaft 10a has a narrow portion 10a1. The narrow portion 10a1 is a portion in which an inner circumferential surface thereof expands radially inward to reduce an internal opening area, and a distal end of the center vent tube 12 is fixed to the first shaft 10a through the expanding inner circumferential surface. The first shaft 10a is rotated by the rotor blade rows 9b of the lower-pressure turbine 9 and transmits rotational power thereof to the rotor blade row 4a of the fan unit 4 and the rotor blade rows 5b of the low-pressure compressor 5.

The second shaft 10b has a length which reaches the rotor blade row 8b of the high-pressure turbine 8 from the rotor blade row 6b of the high-pressure compressor 6, and the rotor blade row 6b of the high-pressure compressor 6 is provided at an upstream end thereof, and the rotor blade row 8b of the high-pressure turbine 8 is provided at a downstream end thereof. The second shaft 10b has a cylindrical shape which surrounds the first shaft 10a from a radial outer side thereof and is provided concentrically with the first shaft 10a. The second shaft 10b is rotated by the rotor blade row 8b of the high-pressure turbine 8 and transmits rotational power thereof to the rotor blade row 6b of the high-pressure compressor 6.

The main nozzle 11 is provided further downstream of the low-pressure turbine 9 and is an opening provided on a furthest downstream side of the jet engine 1. The main nozzle 11 injects the combustion gas passed through the low-pressure turbine 9 toward a rear of the jet engine 1. The propulsive force is obtained by a reaction when the combustion gas is injected from the main nozzle 11.

The center vent tube 12 is a straight pipe in which vent holes 12a (refer to FIG. 2) are provided on an upstream side thereof and a downstream end thereof is open, and is inserted into an inside of the first shaft 10a. An upstream end of the center vent tube 12 is fixed to the narrow portion 10a1 of the first shaft 10a by a bolt (not shown), and the center vent tube 12 rotates with rotation of the first shaft 10a. The center vent tube 12 is connected to an external space of the jet engine 1 and performs exhausting.

Figure 2A:
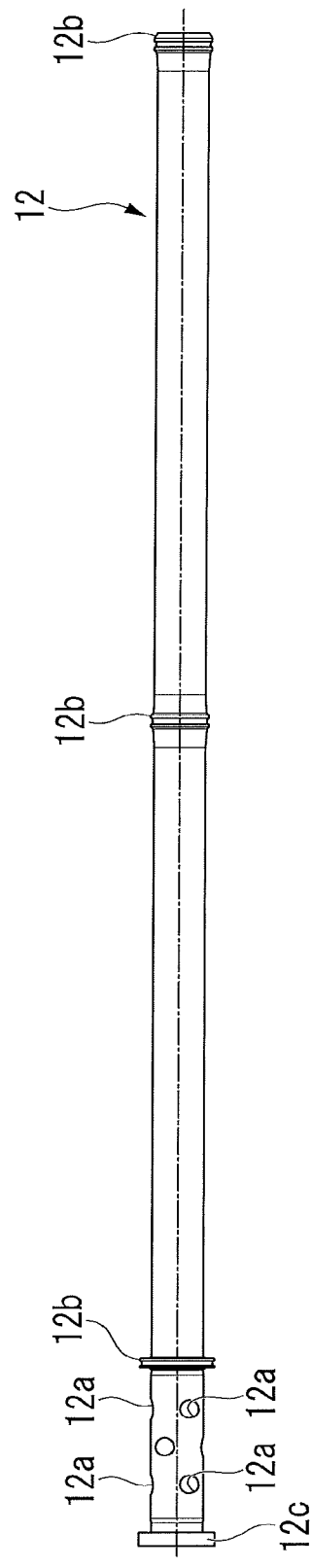
FIG. 2A is an outside view of the vibration reduction damper according to a first embodiment of the present disclosure.
Figure 2B:
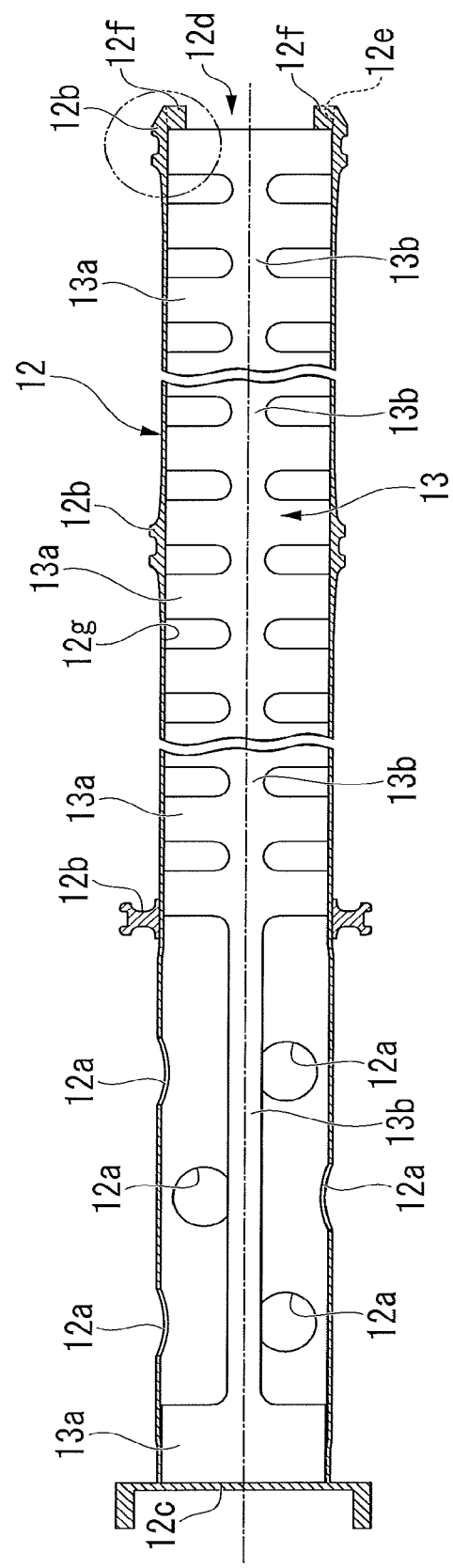
FIG. 2B is an enlarged cross-sectional view including the vibration reduction damper according to the first embodiment of the present disclosure.

FIG. 2A is an outside view of the center vent tube 12. Also, FIG. 2B is an enlarged cross-sectional view including the center vent tube 12. As shown in FIGS. 2A and 2B, vent holes 12a which perform ventilation between an outside and an inside are provided at an upstream end of the center vent tube 12. The vent holes 12a are provided to pass through the center vent tube 12 in a radial direction. Further, a flange portion 12b slidably supported by a center vent tube support mechanism which is not shown in FIGS. 2A and 2B is provided on a circumferential surface of the center vent tube 12. In FIGS. 2A and 2B, three flange portions 12b are provided at three positions which are spaced apart from each other in an axial center direction of the center vent tube 12. The vent holes 12a are formed in a region between an upstream end 12c of the center vent tube 12 and a furthest upstream flange portion 12b of the three flange portions 12b.

Figure 3A:
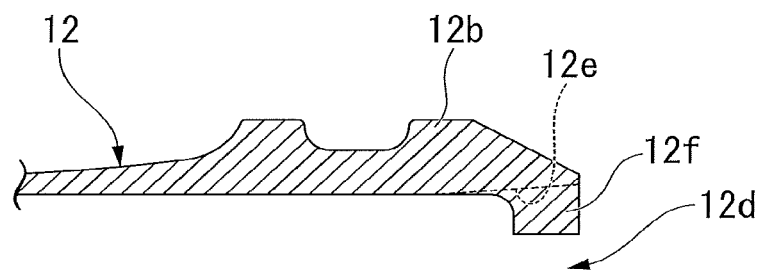
FIG. 3A is a cross-sectional view showing in an enlarged manner a downstream end of a center vent tube in the jet engine with the vibration reduction damper according to the first embodiment of the present disclosure.
Figure 3B:
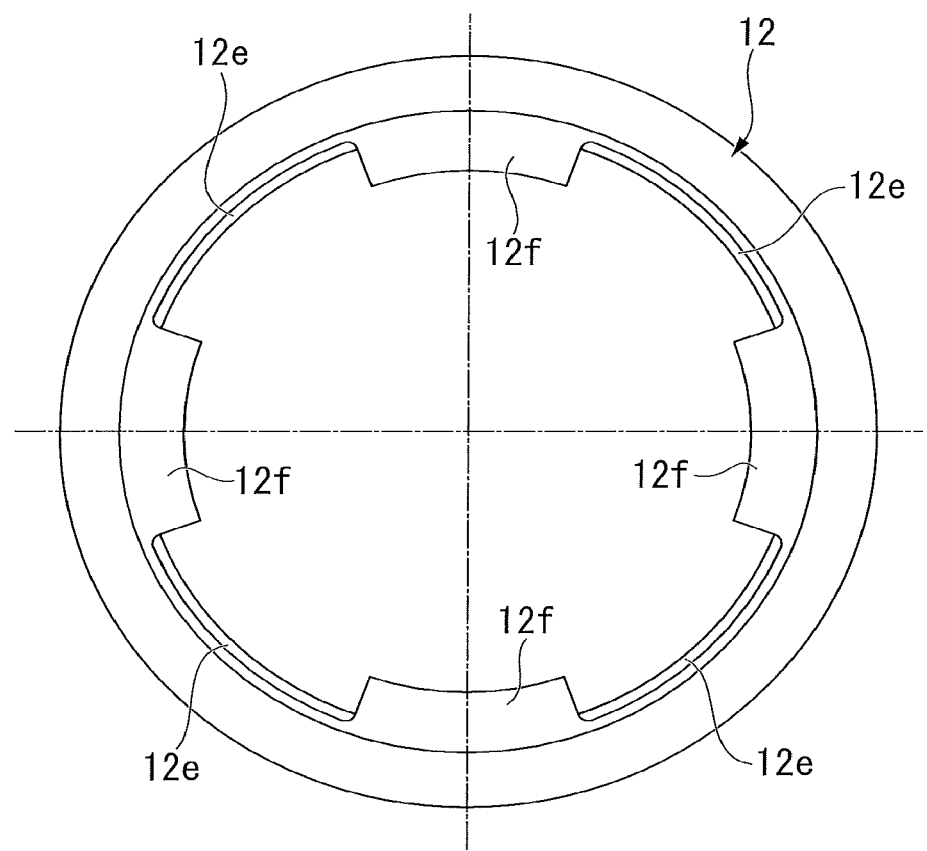
FIG. 3B is a front view showing in an enlarged manner the downstream end of the center vent tube in the jet engine with the vibration reduction damper according to the first embodiment of the present disclosure.

FIGS. 3A and 3B are enlarged views of a downstream end of the center vent tube 12, wherein FIG. 3A is a sectional view and FIG. 3B is a front view. As shown in FIGS. 3A and 3B, an opening 12d (opening end) is formed at a downstream end of the center vent tube 12. As shown in FIG. 3A, an edge surface 12e of the opening 12d is a tapered surface which expands gradually outward in a radial direction of the center vent tube 12 toward a downstream side thereof. As described above, since the edge surface 12e is formed as the tapered surface which expands gradually toward the downstream side thereof, a liquid which flows into the center vent tube 12 is easily discharged from the opening 12d of the center vent tube 12 to the outside.

Further, four tabs 12f (protruding portions) which protrude toward a center of the center vent tube 12 are provided on the edge surface 12e of the opening 12d. The four tabs 12f are arranged at regular intervals in a circumferential direction of the center vent tube 12 and come in contact with the vibration reduction damper 13 from a downstream side thereof, as shown in FIG. 2B. As described above, since the tabs 12f come in contact with the vibration reduction damper 13 from the downstream side of the center vent tube 12 toward the upstream side thereof, the vibration reduction damper 13 can be prevented from escaping from the downstream side of the center vent tube 12.

Figure 4:
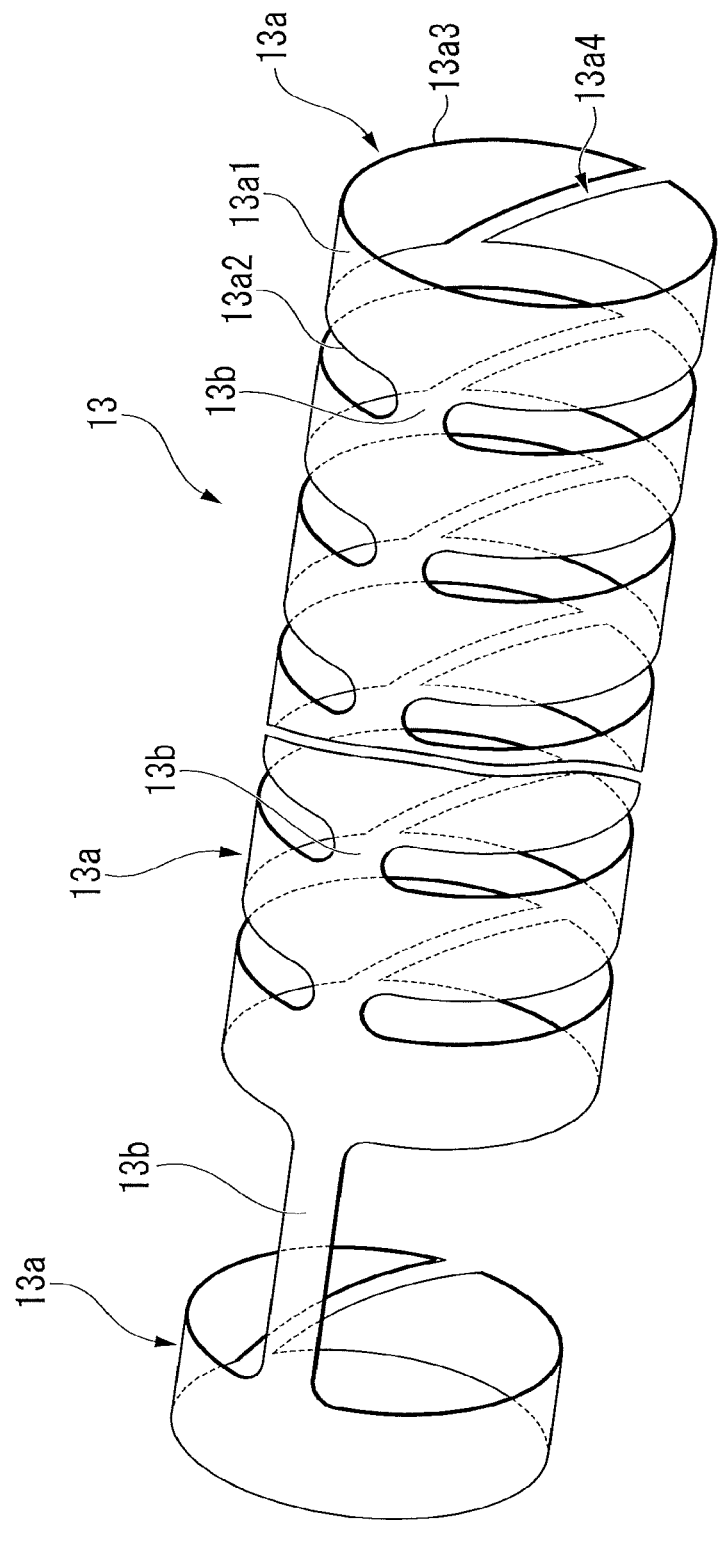
FIG. 4 is a perspective view of the vibration reduction damper according to the first embodiment of the present disclosure.

FIGS. 4 and 5 are views showing the vibration reduction damper 13 of the embodiment. FIG. 4 is a perspective view of the vibration reduction damper 13. Also, (a) of FIG. 5 is a plan view of the vibration reduction damper 13, and (b) of FIG. 5 is a bottom view of the vibration reduction damper 13, As shown in FIGS. 4 and 5, the vibration reduction damper 13 is formed of, for example, an elastic material (e.g., stainless steel) which is more flexible than the center vent tube 12, and annular portions 13a (sliding portions) and a connection portion 13b which connects the annular portions 13a are formed integrally. The annular portion 13a has a certain width in a direction along an axial center of the center vent tube 12, and a radially outer circumferential surface 13a1 thereof can be slidably in contact with an inner wall surface 12g (refer to FIG. 2B) of the center vent tube 12. Each of the annular portions 13a has a slit 13a4 which is obliquely formed from a first end 13a2 (upstream end) to a second end 13a3 (downstream end) in the direction along the axial center of the center vent tube 12. A diameter of the annular portion 13a can be temporarily reduced by the slit 13a4, and thus the vibration reduction damper 13 can be easily inserted into the center vent tube 12.

Further, the slit 13a4 is inclined with respect to the axial center of the center vent tube 12 so that an end thereof close to the first end 13a2 and an end thereof close to the second end 13a3 are spaced apart from each other at a length equal to or greater than a width of the slit 13a4 in a circumferential direction of the center vent tube 12. Since the slit 13a4 is formed to be inclined as described above, a region in which the annular portion 13a is not in contact with the inner wall surface 12g of the center vent tube 12 is eliminated in a circumferential direction of the annular portion 13a, and thus the annular portion 13a and the center vent tube 12 may be in contact with each other over an entire outer circumferential surface of the annular portion 13a.

The annular portions 13a are arranged in the direction along the axial center of the center vent tube 12. In the embodiment, the annular portion 13a disposed on the furthest upstream side and the annular portion 13a disposed second from the upstream side are spaced far apart from each other, and the annular portions 13a after that disposed second from the upstream side are disposed at narrow regular intervals. In the embodiment, the vibration reduction damper 13 is disposed inside the center vent tube 12 so that a region between the annular portion 13a disposed on the most upstream side and the annular portion 13a disposed second from the upstream side overlaps a region in which the vent holes 12a are formed. That is, the vibration reduction damper 13 of the embodiment has the annular portions 13a which are disposed to avoid the region in which the vent holes 12a are formed.

The connection portion 13b connects the annular portions 13a to each other. Also, since the annular portion 13a disposed on the most upstream side and the annular portion 13a disposed second from the upstream side are largely spaced apart from each other, the connection portion 13b which connects the annular portions 13a is longer than other connection portions 13b. Further, all of the connection portions 13b are disposed at the same position in the circumferential direction of the annular portion 13a and are disposed linearly along the axial center of the center vent tube 12 as shown in (a) and (b) of FIG. 5. For example, the vibration reduction damper 13 of the embodiment is formed by stamping a member having a shape, in which the annular portion 13a and the connection portion 13b are developed in a planar shape, from a flat plate and then circularly rolling a portion which is the annular portion 13a of the member. At this time, when all of the connection portions 13b are linearly disposed, the entire portion, which becomes the annular portion 13a by the rolling, of the member having the shape in which the annular portion 13a and the connection portion 13b are developed in a planar shape is disposed in a straight line. Meanwhile, when the connection portion 13b is provided at a different position in the circumferential direction from the annular portion 13a, the portion, which becomes the annular portion 13a by the rolling, of the member having the shape in which the annular portion 13a and the connection portion 13b are developed in a planar shape is disposed to be shifted in a stepwise manner, and a wider plate material is required to form such a member by the stamping. Therefore, since all of the connection portions 13b are disposed linearly, the vibration reduction damper 13 can be manufactured from a small amount of plate material without waste, and manufacturing efficiency of the vibration reduction damper 13 can be improved.

In the jet engine 1 having such a constitution, some of the air introduced by the rotation of the fan unit 4 is compressed in two stages by the low-pressure compressor 5 and the high-pressure compressor 6. The combustion gas is generated by burning the fuel with the generated compressed air in the combustor 7. As the combustion gas passes through the high-pressure turbine 8 and the low-pressure turbine 9, the shaft 10 is driven to rotate, and the propulsive force is also obtained by injecting the combustion gas backward from the main nozzle 11. Further, the center vent tube 12 performs exhausting. At this time, when vibration is applied to the center vent tube 12, the inner wall surface 12g of the center vent tube 12 and the circumferential surface 13a1 of the annular portion 13a of the vibration reduction damper 13 of the embodiment slide to convert vibration energy into frictional heat, and thus the vibration is attenuated.

According to the vibration reduction damper 13 of the embodiment, the annular portion 13a is disposed to avoid the vent holes 12a of the center vent tube 12. Also, since the air can pass through a region surrounded by the annular portion 13a, a flow of the air inside the center vent tube 12 is not hindered by the annular portion 13a. Therefore, the center vent tube 12 can be prevented from being clogged by the vibration reduction damper 13. Accordingly, in the vibration reduction damper 13 of the embodiment, the vibration of the center vent tube 12 can be suppressed without clogging the center vent tube 12.

Further, in the vibration reduction damper 13 of the embodiment, the vibration reduction damper 13 has a simple shape including the annular portion 13a and the connecting portion 13b. Therefore, according to the vibration reduction damper 13 of the embodiment, the vibration reduction damper 13 can be easily manufactured.

Further, in the vibration reduction damper 13 of the embodiment, the annular portion 13a has the slit 13a4 formed from the first end 13a2 to the second end 13a3 in the direction along the axial center of the center vent tube 12. Therefore, the diameter of the annular portion 13a can be easily reduced, and the vibration reduction damper 13 can be easily inserted into the center vent tube 12. Further, since the diameter of the annular portion 13a is easily reduced, the annular portion 13a can be deformed in accordance with deformation of the center vent tube 12 when the center vent tube 12 vibrates. Therefore, the vibration reduction damper 13 restricts the deformation of the center vent tube 12, and a large stress can be prevented from acting on the center vent tube 12.

Further, in the jet engine 1 in which the vibration reduction damper 13 of the embodiment is provided, the center vent tube 12 has the tab 12f which is in contact with the vibration reduction damper 13 from the downstream side to the upstream side. Therefore, the vibration reduction damper 13 can be prevented from protruding to the outside from the center vent tube 12.

Further, the center vent tube 12 may be deformed from a perfect circle when vibrations are applied. Further, the deformation may be different according to a position in the direction along the axial center of the center vent tube 12. For example, on the upstream side of the center vent tube 12, the center vent tube 12 may be deformed into an elliptical shape having a long axis in a vertical direction and a short axis in a horizontal direction, and on the downstream side of the center vent tube 12, a cross section of the center vent tube 12 may be deformed into an elliptical shape having a long axis in the horizontal direction and a short axis in the vertical direction. Even in such a case, in the vibration reduction damper 13 of the embodiment, since a gap is provided between the annular portions 13a, each of the annular portions 13a may be deformed into a different shape and may follow the deformation of the center vent tube 12. Also, the deformation of the center vent tube 12 when the vibration is generated may be analyzed, and a width of each annular portion 13a and an arrangement interval between the annular portions 13a may be changed on the basis of an analysis result.

Second Embodiment

Next, a second embodiment of the present disclosure will be described. Further, in the description of this embodiment, the description of parts the same as those in the first embodiment will be omitted or simplified.

FIG. 6 is a side view of a vibration reduction damper 14 of the embodiment. As shown in FIG. 6, the vibration reduction damper 14 of the embodiment is formed by winding a hand-like member while the hand-like member advances in the direction along the axial center of the center vent tube 12. The vibration reduction damper 14 has a large diameter portion 14a (spiral portion) and a small diameter portion 14b. As shown in FIG. 6, in the vibration reduction damper 14, a portion on the most upstream side and a portion on the downstream side in which the small diameter portion 14b is interposed between the portion on the most upstream side and the portion on the downstream side are defined as the large diameter portions 14a. The large diameter portions 14a are portions which are slidably in contact with an inner wall surface of the center vent tube 12. Further, the small diameter portion 14b is a portion which is formed in accordance with a region in which the vent holes 12a (refer to FIGS. 2A and 2B) of the center vent tube 12 are provided and is also a portion which is wound to have a diameter smaller than the large diameter portion 14a. The small diameter portion 14b is not in contact with the inner wall surface of the center vent tube 12.

According to the vibration reduction damper 14 of the embodiment, the large diameter portion 14a which is in contact with the inner wall surface of the center vent tube 12 is formed to avoid a region in which the vent holes 12a of the center vent tube 12 are formed, and a central portion of the large diameter portion 14a is ventilated. Therefore, the center vent tube 12 can be prevented from becoming clogged by the vibration reduction damper 14. Thus, according to the vibration reduction damper 14 of the embodiment, vibration of the center vent tube 12 can be suppressed without clogging the center vent tube 12.

Further, the vibration reduction damper 14 of the embodiment can be formed by spirally winding the band-like member. Therefore, the vibration reduction damper 14 can be easily manufactured. Accordingly, costs for exchanging the vibration reduction damper 14 and the like can be reduced by lowering a manufacturing cost of the vibration reduction damper 14.

Also in the embodiment, on the upstream side of the center vent tube 12, the center vent tube 12 may be deformed into an elliptical shape having a long axis in a vertical direction and a short axis in a horizontal direction, and on the downstream side of the center vent tube 12, a cross section of the center vent tube 12 may be deformed into an elliptical shape having a long axis in the horizontal direction and a short axis in the vertical direction. Also in such a case, since the vibration reduction damper 14 of the embodiment has a shape in which the band-like member is wound in a spiral shape, the vibration reduction damper 14 can be deformed into different shapes for each part and thus can follow the deformation of the center vent tube 12. Further, the deformation of the center vent tube 12 when the vibration is generated may be analyzed, and a width and a winding pitch of the band-like member may be changed on the basis of an analysis result.

Until now, the preferred embodiments of the present disclosure have been described above with reference to the drawings, but the present disclosure is not limited to the above-described embodiments. Various shapes and combinations of the members described in the above-described embodiments are mere examples, and various modifications can be made based on design requirements or the like without departing from the gist of the present disclosure.

For example, in the above-described embodiment, a part (the annular portion 13a or the large-diameter portion 14a) of the vibration reduction damper is installed on the upstream side of the vent holes 12a of the center vent tube 12. Accordingly, since the upstream end and the downstream end of the vibration reduction damper are in contact with a part of the center vent tube 12, the vibration reduction damper can be prevented from being displaced with respect to the center vent tube 12 in the direction along the axis center thereof. However, the present disclosure is not limited thereto. For example, the vibration reduction damper may be formed to have a shape which does not include a part (the annular portion 13a or the large-diameter portion 14a) of the upstream side thereof.

Further, in the above-described embodiment, a single vibration reduction damper is disposed inside the center vent tube 12. However, the present disclosure is not limited thereto, and vibration reduction dampers may be provided. For example, a constitution in which vibration reduction dampers having the same shape are disposed in the direction along the axis center of the center vent tube 12, or a constitution in which vibration reduction dampers having different shapes are disposed inside the center vent tube 12 may be adopted.

Further, in the above-described embodiment, the slit 13a4 is formed linearly. However, the present disclosure is not limited thereto, and for example, a constitution in which the slit 13a4 is formed to be curved in an arc shape or a wavy shape, or a constitution in which the slit 13a4 is formed to be partially bent may be adopted.

INDUSTRIAL APPLICABILITY

According to the vibration reduction damper of the present disclosure, the vibration of the center vent tube installed in the jet engine can be suppressed without clogging the center vent tube.

What is claimed is:

1. A center vent tube and vibration reduction damper assembly comprising:
   a center vent tube provided with vent holes passing therethrough in a radial direction; and
   a vibration reduction damper disposed inside the center vent tube and having a sliding portion configured to come slidably in contact with an inner wall surface of the center vent tube while avoiding a region in which the vent holes are formed.

2. The center vent tube and vibration reduction damper assembly according to claim 1, wherein the sliding portion includes annular portions of which circumferential surfaces are in contact with the inner wall surface of the center vent tube and which are disposed in a direction along an axial center of the center vent tube, and
   wherein the vibration reduction damper includes a connection portion connecting the annular portions to each other.

3. The center vent tube and vibration reduction damper assembly according to claim 2, wherein the annular portion is provided with a slit formed from a first end to a second end in the direction along the axial center of the center vent tube.

4. The center vent tube and vibration reduction damper assembly according to claim 1, wherein the sliding portion includes a spiral portion wound while advancing in a direction along an axial center of the center vent tube.

5. A jet engine comprising:
   the center vent tube and vibration reduction damper assembly according to claim 1.

6. The jet engine according to claim 5, wherein the center vent tube has a protruding portion formed at an opening end on a downstream side thereof and in contact with the vibration reduction damper from the downstream side toward an upstream side.

* * * * *